(12) United States Patent
Bosselmann et al.

(10) Patent No.: US 7,890,293 B2
(45) Date of Patent: Feb. 15, 2011

(54) DEVICE FOR DETERMINING THE DISTANCE BETWEEN A ROTOR BLADE AND A WALL OF A TURBINE ENGINE SURROUNDING THE ROTOR BLADE

(75) Inventors: Thomas Bosselmann, Marloffstein (DE); Michael Willsch, Jena (DE)

(73) Assignee: Siemens Aktiengesellschaft, Munich (DE)

( * ) Notice: Subject to any disclaimer, the term of this patent is extended or adjusted under 35 U.S.C. 154(b) by 139 days.

(21) Appl. No.: 12/311,387

(22) PCT Filed: Aug. 30, 2007

(86) PCT No.: PCT/EP2007/059034
§ 371 (c)(1),
(2), (4) Date: Mar. 26, 2009

(87) PCT Pub. No.: WO2008/040600
PCT Pub. Date: Apr. 10, 2008

(65) Prior Publication Data
US 2010/0023298 A1 Jan. 28, 2010

(30) Foreign Application Priority Data
Sep. 29, 2006 (DE) .................. 10 2006 046 695

(51) Int. Cl.
*G01C 22/00* (2006.01)

(52) U.S. Cl. .................................................... 702/159
(58) Field of Classification Search .................. 702/159
See application file for complete search history.

(56) References Cited

U.S. PATENT DOCUMENTS
6,717,418 B2 * 4/2004 Orenstein ............... 324/644

FOREIGN PATENT DOCUMENTS
DE 19705769 A1 8/1998
DE 19817430 A1 10/1999
GB 2063001 A 5/1981

* cited by examiner

*Primary Examiner*—Aditya Bhat

(57) ABSTRACT

A device for determining distance between a rotor blade and a wall of a gas turbine surrounding the rotor blade is provided. A waveguide guides and emits electromagnetic waves in the direction of the rotor blade through a waveguide opening facing the rotor blade. The electromagnetic waves are injected into the waveguide and reflected portions of the electromagnetic waves are received. An evaluation unit compares the phase of the electromagnetic waves to be injected with the phase of the reflected portions of the electromagnetic waves and determines phase comparison values for every frequency and the distance is determined based on the phase comparison values. The waveguide includes two waveguide segments made from different materials having temperature stability and damping capacity increasing in the direction from the segment connected to the unit for injecting the waves to the segment having the waveguide opening.

13 Claims, 3 Drawing Sheets

DEVICE FOR DETERMINING THE DISTANCE BETWEEN A ROTOR BLADE AND A WALL OF A TURBINE ENGINE SURROUNDING THE ROTOR BLADE

CROSS REFERENCE TO RELATED APPLICATIONS

This application is the US National Stage of International Application No. PCT/EP2007/059034, filed Aug. 30, 2007 and claims the benefit thereof. The International Application claims the benefits of German application No. 10 2006 046 695.0 filed Sep. 29, 2006, both of the applications are incorporated by reference herein in their entirety.

FIELD OF THE INVENTION

The invention relates to a device for determining the distance between at least one rotor blade and a wall of a gas turbine, said wall surrounding the at least one rotor blade, and to a use of the method.

BACKGROUND OF THE INVENTION

Turbine engines such as steam or gas turbines, for example, are utilized as thermal power engines in engineering for the purpose of converting energy which is stored in a flow of gas into a mechanical energy, in particular into a rotational movement. In order to ensure the reliable operation of turbine engines of said kind, efforts are made to monitor the rotor blades of the blade wheel continuously, particularly during the operation and hence during the rotation of a blade wheel which is arranged in the turbine engine. In this case it is very important to exactly maintain the distance of the rotor blade tips, i.e. the radially outermost edges of the rotor blades, from the wall surrounding the rotor blades (radial clearance). A minimum radial clearance must be satisfied for safety reasons, although too great a radial clearance results in unnecessarily low efficiency. In addition to the radial clearance, the axial distance to wall sections is also important, particularly in the case of blade wheels in which the blade rows are covered by a shroud. Because these variables change due to various dynamic influencing factors, continuous monitoring of the radial clearance and the axial clearance is important during operation. The size of the radial clearance can be monitored e.g. by means of capacitive sensors which are positioned close to and almost touching the blade tips. However, these sensors are limited in terms of accuracy, spatial resolution and service life.

DE 197 05 769 A1 discloses a device for monitoring radial and axial clearance in a turbine engine. In this case use is made of a radar system comprising a transmit and receive unit from which electromagnetic waves having a fixed frequency are directed through a waveguide onto a blade wheel of the turbine engine. In this case the waveguide is ducted through the housing which surrounds the blade wheel and is fixed there. The outlet of the waveguide is arranged very closely over the rotor blade tips of the blade wheel, such that it is possible to determine from the reflection of the emitted electromagnetic waves the distance of a rotor blade tip from the waveguide end and hence from the wall surrounding the rotor blade. The determining is done by means of an evaluation of the phases of the reflected electromagnetic waves. The distance is determined by determining the phase difference between emitted and reflected microwaves.

Extreme thermal conditions can prevail in the region of the blade wheel within the housing during operation, particularly in gas turbines. In the case of gas turbines, temperatures of approximately 1200° C. usually occur in the flow channel. These extreme temperatures place particular demands on the nature of the waveguide, which must be embodied such that it exhibits temperature stability at the same time as having a low damping capacity for the electromagnetic waves to be guided. Materials having high temperature stability, e.g. superalloys, are generally characterized by a very high damping capacity for the electromagnetic waves to be guided, while materials having a low damping capacity, e.g. copper, are unstable at extreme temperatures of the specified level.

SUMMARY OF THE INVENTION

The object underlying the present invention is to disclose an appropriate device and use of the device, wherein the waveguide can guide electromagnetic waves with the least possible damping while remaining stable at high temperatures.

The object is achieved by a device according to the features recited in the independent claim.

Accordingly, the device for determining the distance between at least one rotor blade and a wall of a gas turbine, said wall surrounding the at least one rotor blade, comprises the following parts:

a waveguide for guiding electromagnetic waves and emitting electromagnetic waves in the direction of the rotor blade through at least one waveguide opening which faces the rotor blade, at least one means, this being connected to the waveguide, for injecting the electromagnetic waves into the waveguide, at least one means, this being connected to the waveguide, for receiving reflected portions of the electromagnetic waves to be injected into the waveguide, and an evaluation unit for evaluating the reflected portions to be received of the electromagnetic waves to be injected, comprising means for comparing the phases of the electromagnetic waves to be injected with the phases of the reflected portions of the electromagnetic waves to be injected, wherein a phase comparison value can be ascertained for each frequency by means of the evaluation unit and the distance can be determined from a comparison of the phase comparison values, and is embodied such that the waveguide is configured from at least two waveguide segments which are made from different materials, wherein the temperature stability and the electromagnetic wave damping capacity of the materials increase, starting from the segment which is connected to the means for injecting and receiving, in the direction of the segment having the waveguide opening.

The invention is based on the insight that the temperature of the waveguide decreases from the waveguide opening in the direction of the means for injecting and receiving. In order to ensure that the electromagnetic waves are guided as effectively as possible in the waveguide, the present invention maps this temperature decrease profile onto the waveguide in first approximation, such that the waveguide meets the requirements relating to temperature stability and damping capacity, being inventively composed of segments of different materials, each having a different damping capacity and a different temperature stability.

Advantageous embodiments of the device according to the invention are derived from the dependent claims of the independent claim. In this case the embodiment according to claim 1 can be combined with the features of one of the associated dependent claims or preferably also with the features of a plurality of dependent claims. Accordingly, the inventive device can additionally have further features as follows:

The waveguide can be configured from three segments. In this way it is possible to achieve a better adaptation to the temperature profile which is prevalent in the waveguide during operation of the gas turbine.

The segment which is connected to the means for injecting and receiving can advantageously be configured from a metal having a low damping capacity, in particular a group-11 element or platinum, and the segment featuring the waveguide opening from a superalloy having high temperature stability.

Copper, silver and gold, which are options as group-11 elements, offer excellent electrical conductivity, and this is exhibited in a very low damping capacity when guiding electromagnetic waves. It is therefore possible to extend the waveguide segment, which is configured from a group-11 element or platinum or at least has an inner coating of a group-11 element or platinum, so far that the means which are connected to this segment for injecting and receiving can be arranged at a safe distance from the wall of the gas turbine.

A superalloy designates alloys of complex composition for high-temperature applications. Suitable candidates in this case are alloys based on iron, nickel, or cobalt with additives of the elements cobalt, nickel, iron, chromium, molybdenum, tungsten, rhenium, ruthenium, tantalum, niobium, aluminum, titanium, manganese, zirconium, carbon and/or boron. With a temperature stability of more than 1200° C., such a waveguide segment resists high temperatures which are prevalent in the flow channel and hence at the side of the wall facing the flow channel during operation of the gas turbine.

A central segment can advantageously be configured from a special steel. This ensures that such a segment is corrosion-resistant. The temperature stability and the damping capacity of special steel lie between superalloy and group-11 element.

It can be favorable if the segment connected to the means for injecting and receiving is configured such that it can be cooled by a liquid or air. It is therefore possible to embed this segment deeper into the wall in the direction of the flow channel. Temperature damage is prevented by the cooling in this case. Water can be used as a cooling liquid, for example.

In the transition zone of two consecutive segments, the waveguide can advantageously have a coating of one of the two segment materials. In this way reflections of the electromagnetic waves at the boundary surfaces of the transition zone between two segments are avoided and the guiding properties of the waveguide are improved.

It can be advantageous if the segment having the waveguide opening is embodied as a horn. This ensures that the electromagnetic waves leave the waveguide with a radiation characteristic which is defined by the horn and the reflected portions of the emitted electromagnetic waves can be received again with a higher yield, since the receive yield is determined by the horn diameter at the waveguide end. In this case the segment having the waveguide opening terminates flush with the inner surface of the wall facing the flow channel. However, it can also be set back in the wall opening, so that the segment is not exposed to the direct gas stream in the flow channel.

The electromagnetic waves can favorably be millimeter waves, in particular in the frequency range from 70 GHz to 150 GHz. Since the wavelengths in these frequencies are approximately 4 millimeters and less, it is possible to deploy very compact waveguides whose cross-sectional dimensions are typically selected to match the dimensions of the wavelengths to be guided.

The invention also relates to a use of the inventive device for determining the distance between at least one rotor blade and a wall, surrounding the at least one rotor blade, of a gas turbine.

The waveguide can advantageously be arranged in a cooling channel of the wall in this case. Consequently, one of many cooling channels which are already provided in the wall for cooling purposes can be used for installing the device according to the invention.

BRIEF DESCRIPTION OF THE DRAWINGS

Preferred but by no means restrictive exemplary embodiments of the device are explained below with reference to the drawing. For the sake of clarity, the drawing is not to scale and some features are illustrated schematically.

Corresponding parts are labeled with the same reference signs in FIGS. 1 to 4.

DETAILED DESCRIPTION OF THE INVENTION

Figure 1:
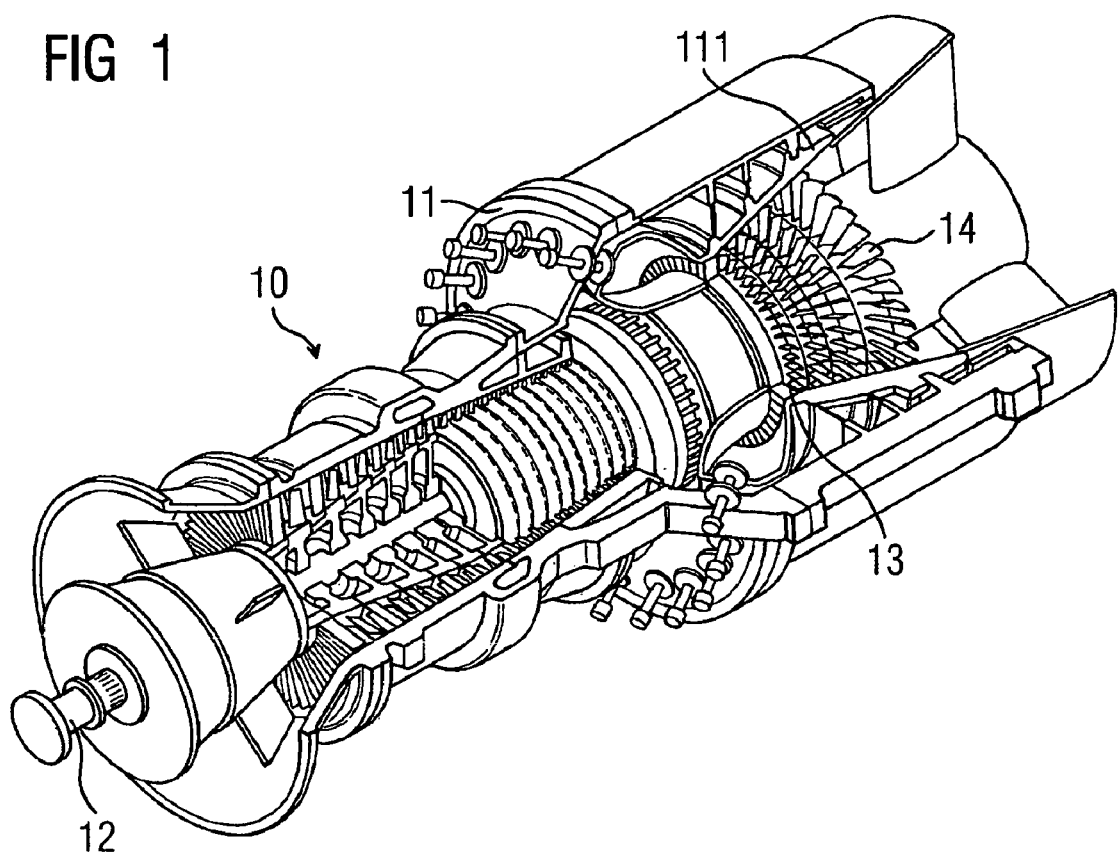
FIG. 1 shows a gas turbine according to the prior art in a partially sectioned perspective view.

FIG. 1 shows a gas turbine 10 according to the prior art which is designed for a high gas inlet temperature of approximately 1200° C. In a housing 11 comprising an inner wall 111, the gas turbine 10 has a rotatably mounted rotor shaft 12 on which rotor blades 14 are arranged in a flow channel 13.

Figure 2:
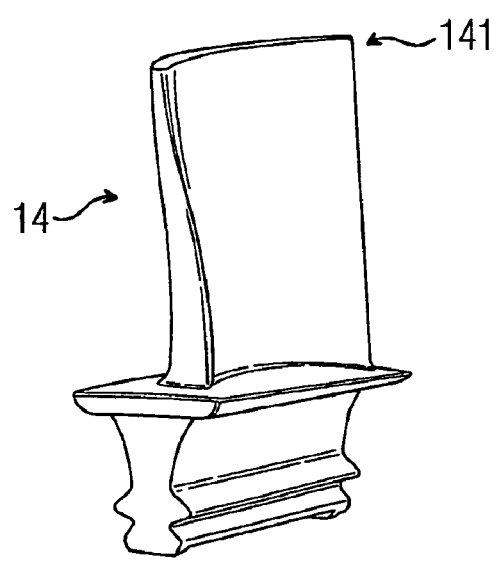
FIG. 2 shows a rotor blade of the gas turbine from FIG. 1.

FIG. 2 shows a rotor blade 14 of said type in detail in an uninstalled state. In the installed state the upper end of the rotor blade 14, the so-called rotor blade tip 141, faces the inner wall 111 of the gas turbine housing 11.

Figure 3:
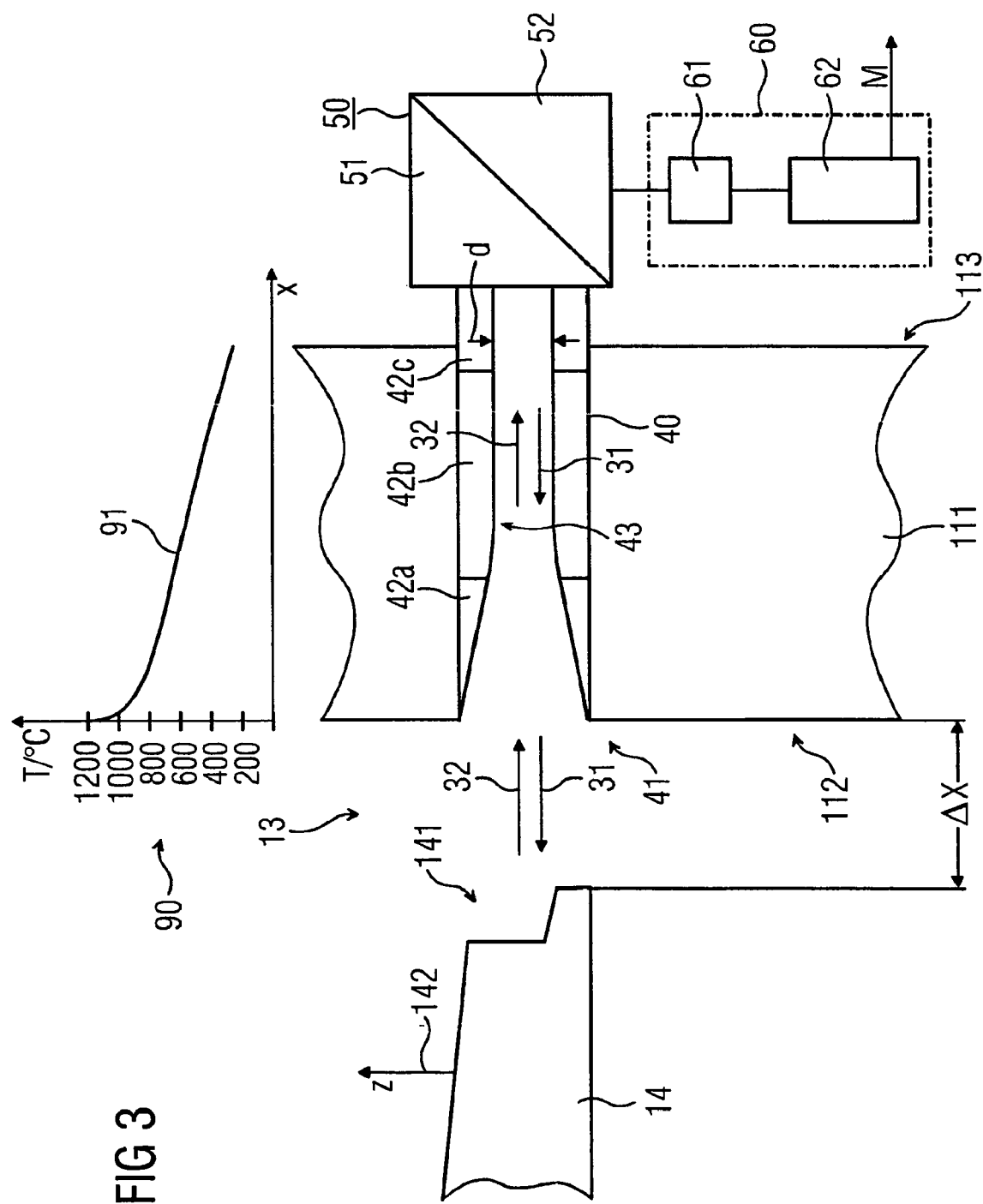
FIG. 3 shows a schematic illustration of the inventive device comprising three waveguide segments.

FIG. 3 shows a schematic illustration of the inventive device in a first exemplary embodiment. For the sake of simplicity, only part of a rotor blade 14 is shown in outline. The arrow 142 indicates that during a distance measurement the rotor blade 14 moves in the direction of the arrow 142 during operation of the gas turbine 10. The movement in the direction of the arrow can be considered approximately as a linear movement in the lateral direction z. The rotor blade tip 141 is located at a radial distance $\Delta x$ from the inner wall 111 of the gas turbine housing 11. In order to ensure optimal efficiency of the gas turbine 10, the distance $\Delta x$ between the ends of the rotor blades 14, i.e. the rotor blade tips 141, and the inner wall 111 of the gas turbine housing 11 is as small as possible and typically lies within a range of a few millimeters, in particular between 1 mm and 20 mm. The wall 111 has at least one opening in which a waveguide 40 for guiding electromagnetic waves 31, 32 is arranged with positive fit. The waveguide 40 is advantageously installed in one of numerous cooling channels which are already present in the wall 111. The waveguide 40 is embodied as tubular and has e.g. a round or rectangular cross-section having an internal diameter d in the range from 2 mm to 10 mm.

During operation of the gas turbine 10, a temperature of approximately 1200° C. is prevalent in the flow channel 13. The surface 112 of the wall 111 facing the flow channel 13 therefore likewise has this high temperature, though this decreases through the wall 111 in the direction of the opposite surface 113 of the wall 111. The temperature profile 91 is represented in the diagram 90 by way of example. The temperature T is plotted on the ordinate, while the abscissa represents the section through the wall 111 in the x direction. According to the diagram 90, the temperature decreases steadily from 1200° C. at the inner surface 112 of the wall 111 to approximately 200° C. at the outer surface 113 of the wall 111, a temperature of approximately 600° C. prevailing midway between both surfaces 112, 113.

The waveguide 40 is configured from a plurality of segments 42a, 42b, 42c, e.g. three according to FIG. 3, along its longitudinal axis which here points in the x direction. In this case its materials are selected according to the invention as a function of the temperature profile 91, in order to ensure high temperature stability at the same time as optimal waveguide properties over the entire length of the waveguide 40.

Thus, the segment 42a having the waveguide opening 41 in the region of the inner surface 112 of the wall 111 is produced from a superalloy. Suitable materials for this segment 42a are in particular "Inconel" (a brand name of the company "Special Metals Corporation", USA) or "PM 1000" (a brand name of the company "Plansee GmbH", Germany). In this case the main consideration for the segment 42a coming closest to the flow channel 13 is good temperature stability at extreme temperatures in the region of 1200° C. The damping properties are less important in this region of the waveguide. For the purpose of improved radiation and reception characteristics of the waveguide 40, the segment 42a having the waveguide opening 41 is also configured as a horn.

The segment 42c of the waveguide 40, which segment is located in the region of the outer surface 113 of the wall 111 and is connected to a transmit/receive unit 50, is exposed to a relatively low temperature. Consequently, the temperature stability in this region of the waveguide 40 is of lesser importance. The priority here is to ensure a good wave conductivity of the waveguide 40 and hence a low damping capacity of the segment 42c for the electromagnetic waves 31, 32 to be guided in the waveguide 40. This is inventively achieved in that the segment 42c which is connected to the transmit/receive unit is configured from a group-11 element or platinum. Alternatively, this segment 42c can also be produced from special steel, wherein the inner surface 43 of the waveguide 40, said inner surface being responsible for guiding the electromagnetic waves 31, 32, is provided with a coating of a group-11 element or platinum. In this case it is possible to extend the segment 42c and hence the waveguide 40 so far that the transmit/receive unit 50 which is attached to this segment 42c can be arranged at a safe distance from the wall 111 of the gas turbine 10.

The intermediate segment 42b which is arranged between both aforementioned segments 42a and 42c is advantageously configured from special steel. Consequently, the segment 42b is corrosion-resistant and has adequate temperature stability in the temperature range in the proximity of 600° C. The temperature stability and the damping capacity of special steel lie between superalloy and group-11 element. If the segment 42a having the waveguide opening 41 is manufactured from "PM 1000", for example, the intermediate segment 42b can also be made from "Inconel" as an alternative.

The transition zone of two consecutive segments 42a, 42b or 42b, 42c in the inner region of the waveguide 40, said inner region guiding the electromagnetic waves 31, 32, can be coated with a material from which one of the two segments 42a, 42b or 42b, 42c is made. By means of such a coating of the transition zone of the inner surface 43, reflections of the electromagnetic waves 31, 32 at the boundary surfaces of the transition zone between two segments 42a, 42b or 42b, 42c is avoided, thereby improving the overall guiding properties of the waveguide 40.

An operation for determining the distance takes place as described in detail below:

The transmit/receive unit 50, which comprises means for injecting 51 and receiving 52 electromagnetic waves 31, 32, in particular microwaves in the frequency range from 70 GHz to 150 GHz, injects electromagnetic waves 31 having e.g. a frequency a into the waveguide 40 using the injection means 51 which is connected to the waveguide 40. The electromagnetic waves 31 are then emitted through the waveguide opening 41 in the direction of the rotor blade 14. After traversing the distance Δx, at least a portion 32 of the emitted electromagnetic waves 31 is reflected by the rotor blade tips 141 to the waveguide 40 and then supplied from the waveguide 40 to the transmit/receive unit 50. The reflected portion 32 of the emitted electromagnetic waves 31 is detected using e.g. a receive diode as a means 52 for receiving electromagnetic waves, and converted into corresponding electrical signals which are supplied to an evaluation unit 60. The phase value $\phi_r a$ of the electromagnetic waves 32 that are assigned to the frequency a is initially determined from the electrical signals by means of the evaluation unit 60. The phases $\phi_0 a$ of the emitted electromagnetic waves 31 are then compared with the phases $\phi_r a$ of the reflected portions 32 of the emitted electromagnetic waves 31 using a phase comparison means 61. The phase comparison value $\Delta\phi a$, which is determined e.g. by means of a phase difference value $\Delta\phi a = \phi_r a - \phi_0 a$, is directly dependent in this case on the distance traversed by the electromagnetic waves 31 that were injected by the transmit means 51. The comparison value $\Delta\phi a$ thus obtained is then assigned by an assignment means 62 to a measured value M for the distance Δx between rotor blade tip 141 and wall 111. The assignment can be done e.g. on the basis of a value table or also a suitable algorithm.

The measured value M which is determined for the distance Δx of the at least one rotor blade 14 is reported to a monitoring point or forwarded to a central office via display or reporting means which are not represented in greater detail.

The evaluation unit 60 can also be equipped with a comparison function by means of which it is possible to detect that a predefinable distance threshold has not been met. If the threshold value is not met, a message can be output automatically, for example, in order to initiate a suitable protective measure such as the shutting-down of the gas turbine 10, for example.

Figure 4:
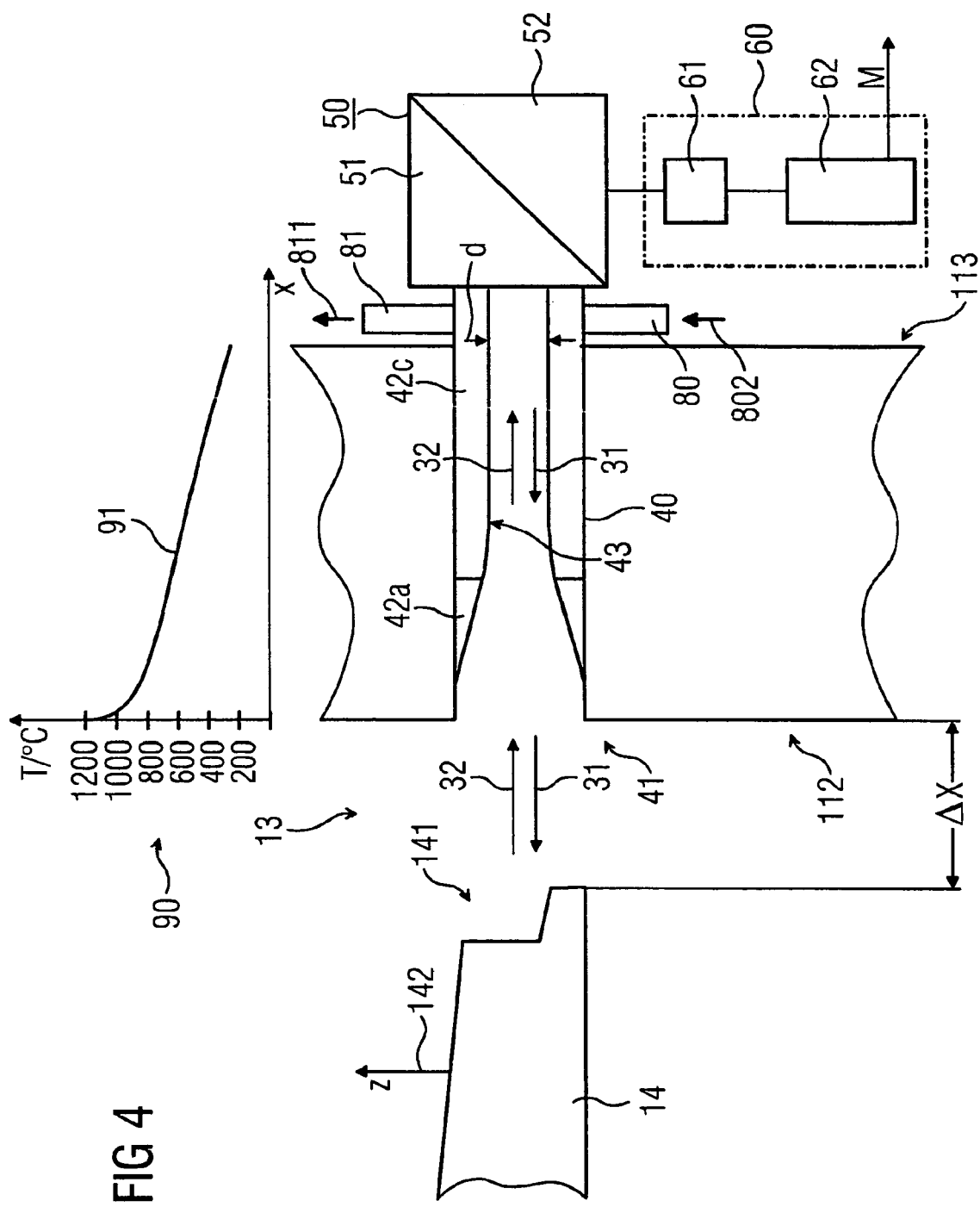
FIG. 4 shows a schematic illustration of the inventive device comprising two waveguide segments.

A further exemplary embodiment of the inventive device is schematically illustrated in FIG. 4. It largely corresponds to the exemplary embodiment according to FIG. 3. Only the differences are discussed in the following:

According to FIG. 4, the waveguide 40 has only two segments 42a, 42c. The intermediate segment 42b indicated in FIG. 3 is omitted. In this case the segment 42a having the waveguide opening 41 does not terminate flush with the inner surface 112 of the wall 111, but is set back in the x direction in order that it is not directly exposed to the temperatures in the flow channel 13. A superalloy, in particular "Inconel", is also particularly suitable as a material for the segment 42a. As described above, the segment 42c which is connected to the transmit/receive unit 50 is produced from a group-11 element or platinum or alternatively from special steel, the inner surface 43 of the waveguide 40 being provided with a coating of a group-11 element or platinum. Because the segment 42c which is connected to the transmit/receive unit 50 extends as far as midway between both surfaces 112, 113 of the wall 111, at least this segment 42c is provided with a cooling device.

For this purpose the segment 42c has channels (not shown in FIG. 4) for carrying a liquid or gaseous cooling agent such as water or air, for example. The cooling agent can be carried through the cooling channels via inlet connection pieces 80 and outlet connection pieces 81 which are arranged at the segment 42c. In this case the arrows 802, 811 indicate the inlet and outlet of the cooling agent, respectively. This ensures that the segment 42c which is connected to the transmit/receive unit 50 is protected against thermal damage in the central region of the wall 111.

The present invention is not restricted to the exemplary embodiments shown. The scope of protection also covers the provision of a plurality of waveguides 40 for emitting and/or receiving, in order, for example, to achieve measurement redundancy or also greater precision.

The invention claimed is:

1. A device for determining a distance between a rotor blade and a wall of a gas turbine surrounding the rotor blade, comprising:
    a waveguide that guides and emits electromagnetic waves in a direction to the rotor blade through a waveguide opening facing the rotor blade;
    a first unit connected to the waveguide that injects the electromagnetic waves into the waveguide;
    a second unit connected to the waveguide that receives reflected portions of the electromagnetic waves; and
    an evaluation unit that compares phases of the electromagnetic waves to be injected with phases of the reflected portions of the electromagnetic waves for each frequency and determines the distance based on the phase comparison,
    wherein the waveguide comprises at least two waveguide segments that are made from different materials, and
    wherein a temperature stability and an electromagnetic wave damping capacity of the materials increase starting from a segment connected to the first and the second units in a direction of a segment having the waveguide opening.

2. The device as claimed in claim 1, wherein the waveguide comprises:
    a first segment that is connected to the first and the second unit,
    a second segment that has the waveguide opening, and
    a central segment that is between the first and the second segment.

3. The device as claimed in claim 2, wherein the first segment is made from a metal having a low damping capacity.

4. The device as claimed in claim 3, wherein the second segment is made from a superalloy having a high temperature stability.

5. The device as claimed in claim 4, wherein the central segment is made from a special steel.

6. The device as claimed in claim 5, wherein a transition zone of two consecutive segments comprises a coating of one of the materials of the two consecutive segments.

7. The device as claimed in claim 3, wherein the first segment is made from copper, silver, gold or platinum.

8. The device as claimed in claim 2, wherein the first segment is cooled by a liquid or air.

9. The device as claimed in claim 2, wherein the second segment is a horn.

10. The device as claimed in claim 1, wherein the electromagnetic waves are millimeter waves.

11. The device as claimed in claim 10, wherein the electromagnetic waves has a frequency range from 70 GHz to 150 GHz.

12. A method for determining a distance between a rotor blade and a wall of a gas turbine surrounding the rotor blade, comprising:
    injecting electromagnetic waves into a waveguide by a first unit connected to the waveguide;
    guiding and emitting the electromagnetic waves by the waveguide in a direction to the rotor blade through a waveguide opening facing the rotor blade;
    receiving reflected portions of the electromagnetic waves by a second unit connected to the waveguide; and
    comparing phases of the electromagnetic waves to be injected with phases of the reflected portions of the electromagnetic waves for each frequency of the electromagnetic waves; and
    determining the distance based on the phase comparison,
    wherein the waveguide comprises at least two waveguide segments that are made from different materials, and
    wherein a temperature stability and an electromagnetic wave damping capacity of the materials increase starting from a segment connected to the first and the second units in a direction of a segment having the waveguide opening.

13. The method as claimed in claim 12, wherein the waveguide is arranged in a cooling channel of the wall.

* * * * *